(12) United States Patent
Hisada et al.

(10) Patent No.: US 7,380,257 B2
(45) Date of Patent: May 27, 2008

(54) OPTICAL INFORMATION RECORDING MEDIUM

(75) Inventors: Kazuya Hisada, Osaka (JP); Eiji Ohno, Hirakata (JP); Keiji Nishikiori, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 80 days.

(21) Appl. No.: 10/980,267

(22) Filed: Nov. 4, 2004

(65) Prior Publication Data

US 2005/0132395 A1 Jun. 16, 2005

(30) Foreign Application Priority Data

Dec. 10, 2003 (JP) ............................. 2003-411114

(51) Int. Cl.
*G11B 7/24* (2006.01)

(52) U.S. Cl. ..................................... 720/723

(58) Field of Classification Search ............ 369/275.5, 369/286, 289.1, 290.1, 275.1, 280, 282–283; 428/64.4, 64.6, 64.9, 68.6; 720/721–724, 720/619, 706

See application file for complete search history.

(56) References Cited

U.S. PATENT DOCUMENTS

| | | | | |
|---|---|---|---|---|
| 4,669,076 A | * | 5/1987 | Broom et al. .............. | 720/706 |
| 5,276,670 A | * | 1/1994 | Nogami et al. ............. | 369/116 |
| RE35,947 E | * | 11/1998 | Kosinski et al. .......... | 369/275.5 |
| 5,846,626 A | | 12/1998 | Kashiwagi et al. | |
| 5,987,003 A | * | 11/1999 | Yokota ....................... | 369/280 |
| 6,353,592 B1 | * | 3/2002 | Kashiwagi et al. ......... | 369/283 |
| 6,507,559 B1 | * | 1/2003 | Iwaki ....................... | 369/275.5 |
| 6,735,166 B1 | * | 5/2004 | Kusafuka et al. ........... | 369/280 |
| 6,743,527 B2 | | 6/2004 | Hisada et al. | |
| 2001/0043555 A1 | * | 11/2001 | Hisada et al. ............. | 369/283 |
| 2001/0053121 A1 | * | 12/2001 | Komaki et al. ............. | 369/283 |
| 2002/0018440 A1 | * | 2/2002 | Komaki et al. ............. | 369/283 |
| 2002/0075794 A1 | * | 6/2002 | Park ........................... | 369/282 |
| 2002/0085482 A1 | * | 7/2002 | Kikuchi et al. ............ | 369/275.1 |
| 2002/0093895 A1 | * | 7/2002 | Fujiura ....................... | 369/282 |
| 2005/0102693 A1 | * | 5/2005 | Schuller et al. ............ | 369/282 |
| 2005/0226131 A1 | | 10/2005 | Ushida et al. | |

FOREIGN PATENT DOCUMENTS

CN 1334560 2/2002

(Continued)

OTHER PUBLICATIONS

Machine-assisted translation of JP 2001319386 A.*

(Continued)

*Primary Examiner*—Thang V. Tran
*Assistant Examiner*—Nathan Danielsen
(74) *Attorney, Agent, or Firm*—Wenderoth, Lind & Ponack, L.L.P.

(57) ABSTRACT

An optical information recording medium has tolerance to warping. The optical information recording medium includes at least one information recording layer on a main surface of a substrate and a light-transmitting layer. The substrate includes a clamp area and an information recording area in accordance with the information recording layer. In the light-transmitting layer, the average thickness of a second area corresponding to the clamp area is thinner than the average thickness of a first area corresponding to the information recording area.

27 Claims, 12 Drawing Sheets

FOREIGN PATENT DOCUMENTS

| | | |
|---|---|---|
| EP | 0 729 141 | 8/1996 |
| JP | 8-235638 | 9/1996 |
| JP | 11-191240 | 7/1999 |
| JP | 2001319386 A * | 11/2001 |
| JP | 2003-162847 | 6/2003 |
| JP | 2003-317334 | 11/2003 |
| JP | 2004-039050 | 2/2004 |
| WO | 2004/003902 | 1/2004 |

OTHER PUBLICATIONS

Chinese Office Action issued in corresponding Chinese Application No. 200410097938.6 issued May 25, 2007 w/English translation.

* cited by examiner

[Fig. 1]
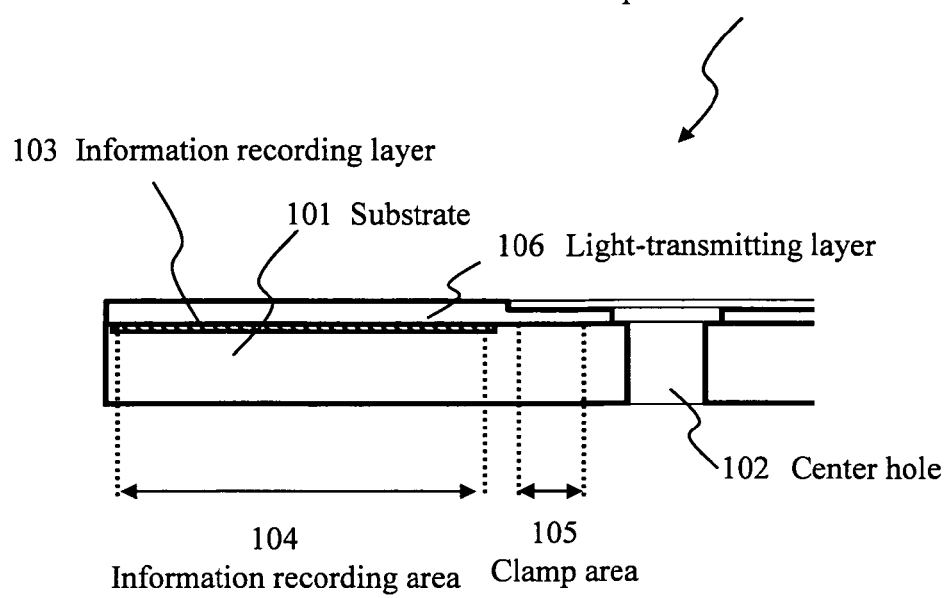

[Fig. 2]
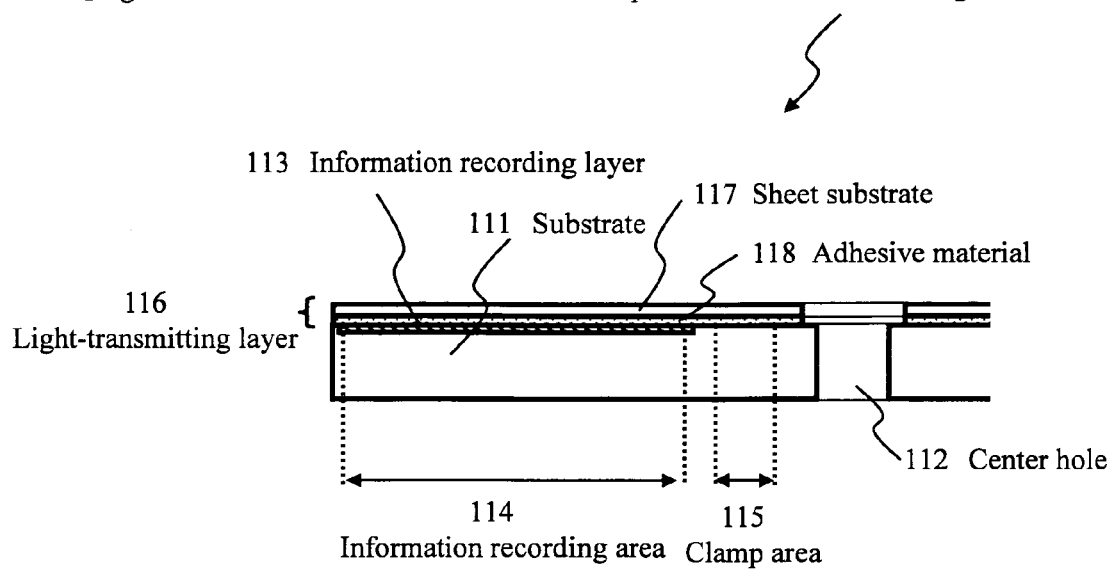

[Fig. 3]
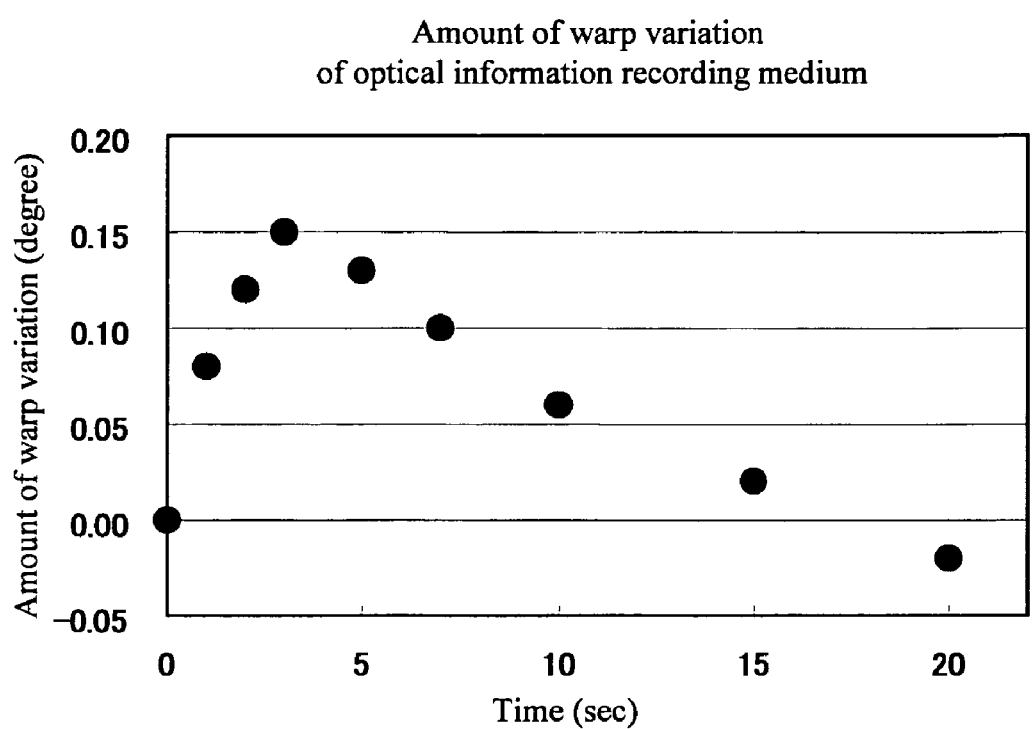

[Fig. 4]
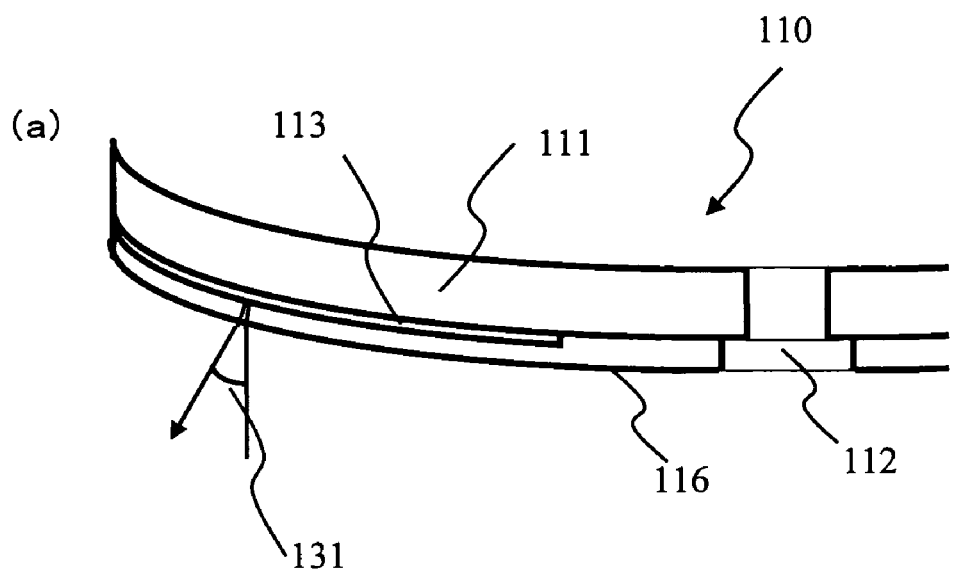
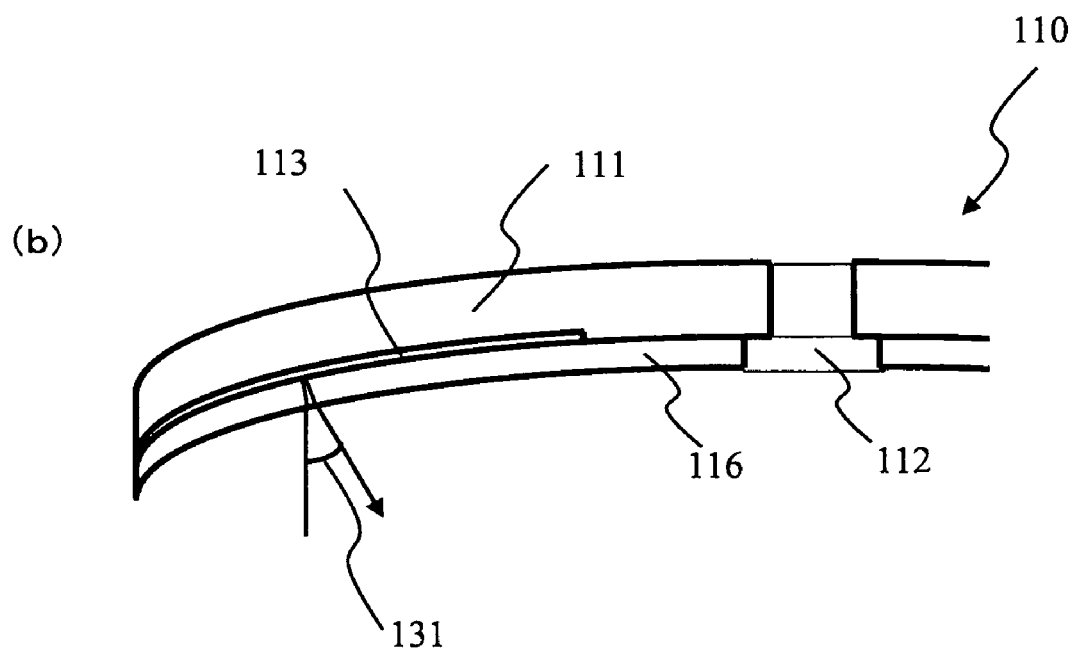

[Fig. 5]
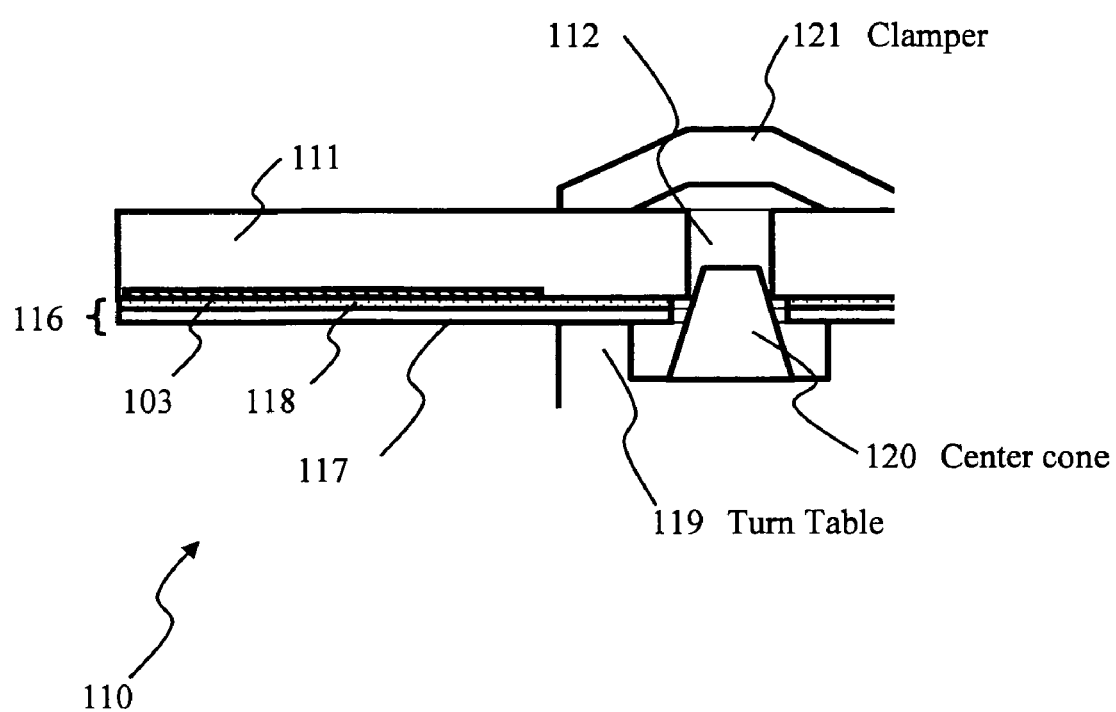

[Fig. 6]
(a)
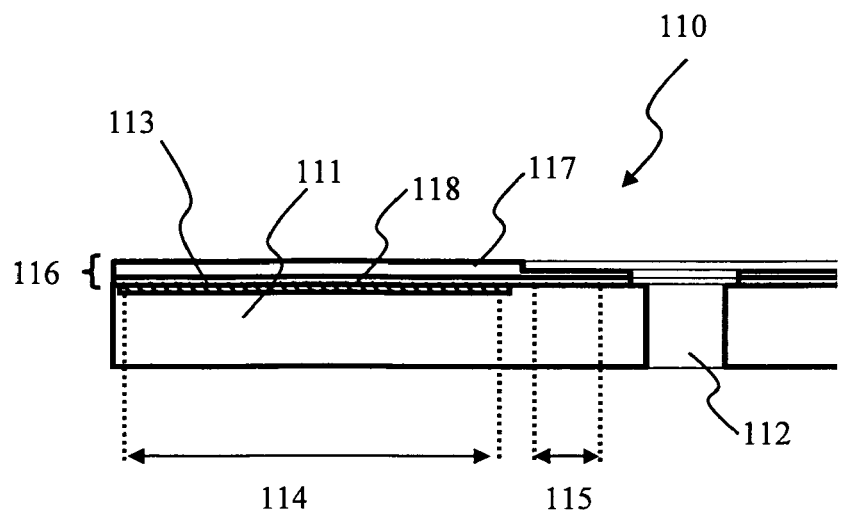
(b)
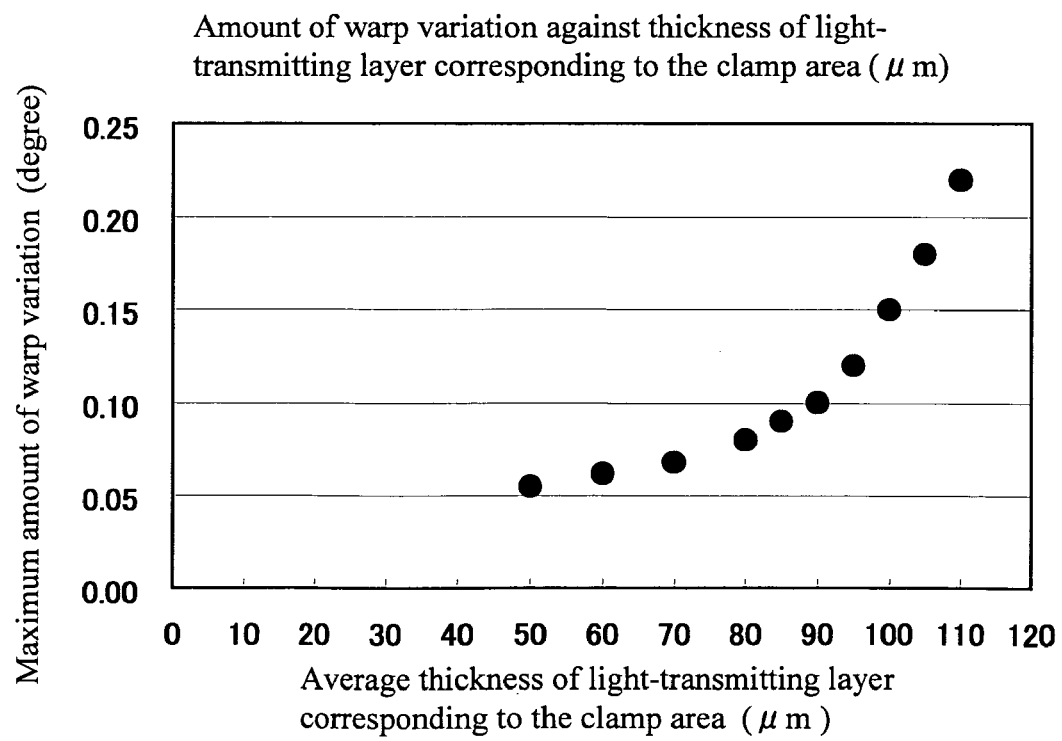

[Fig. 7]
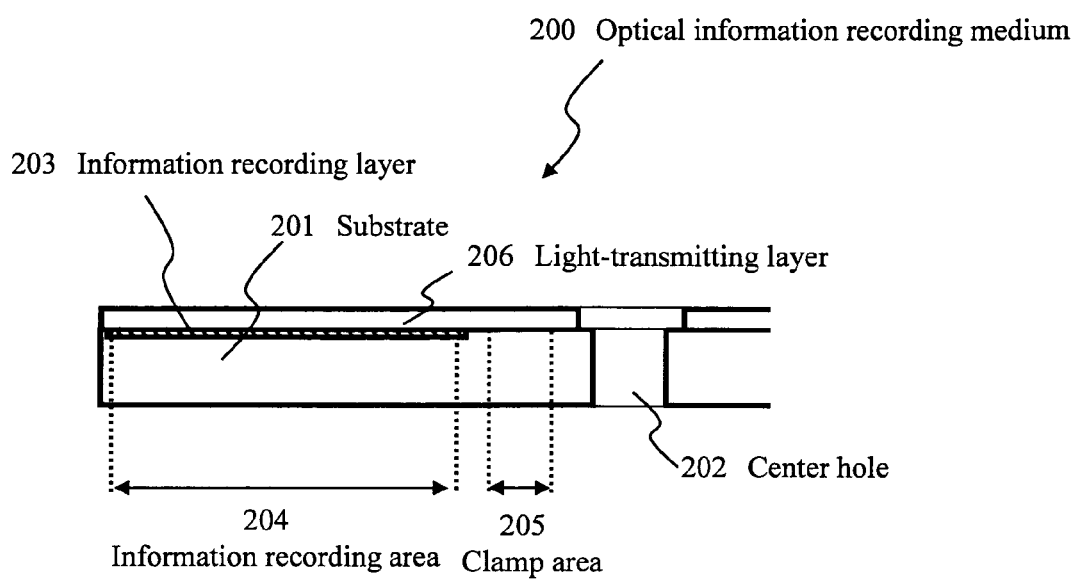

[Fig. 8]
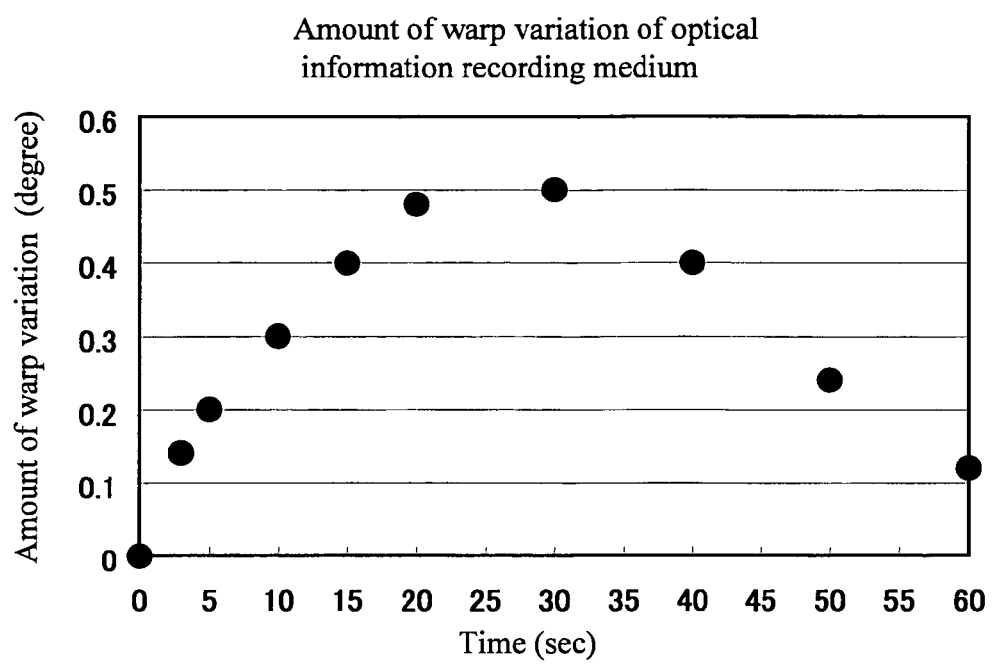

[Fig. 9]
(a)
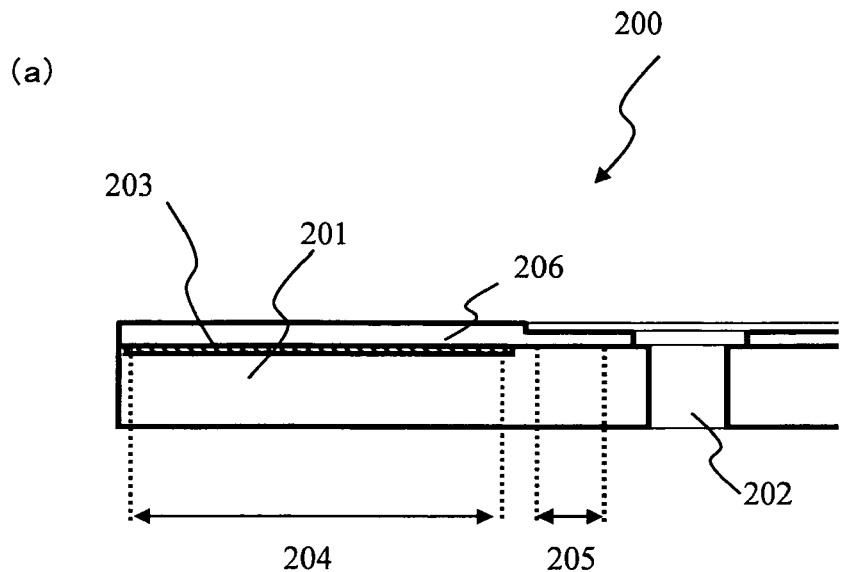
(b)
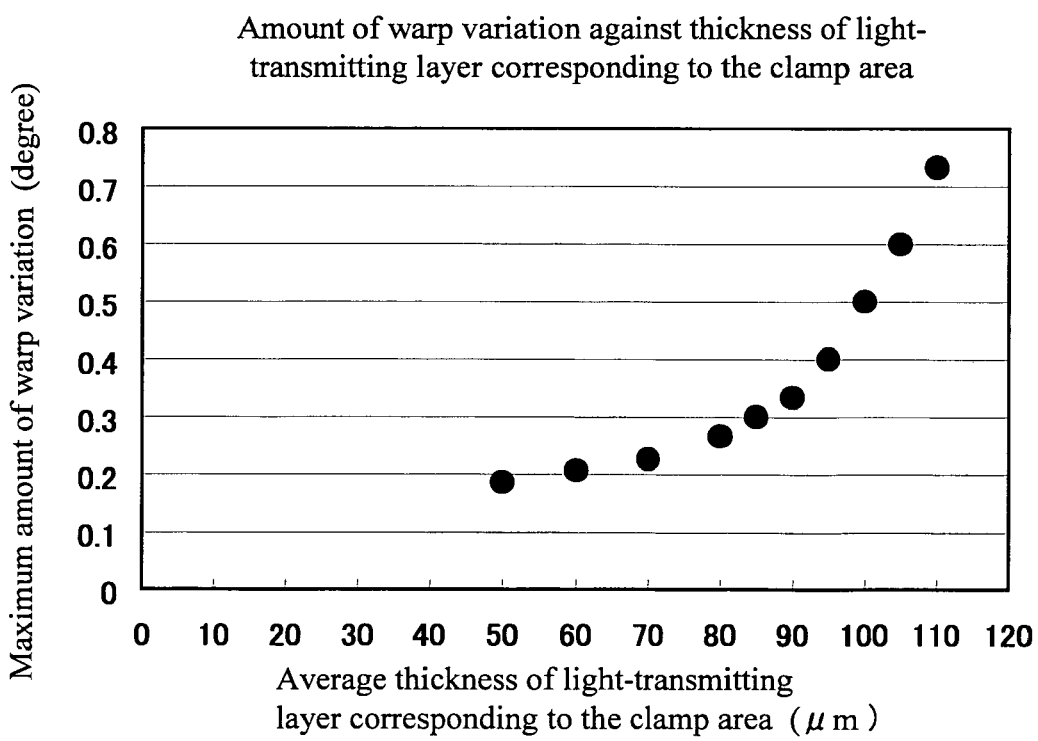

[Fig. 10]
(a)
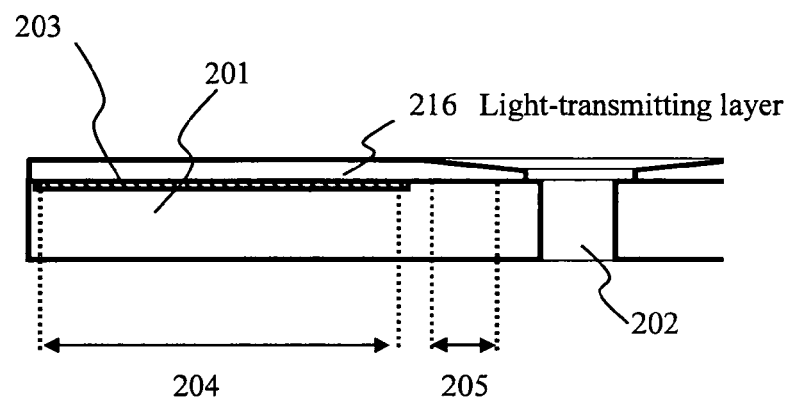
(b)
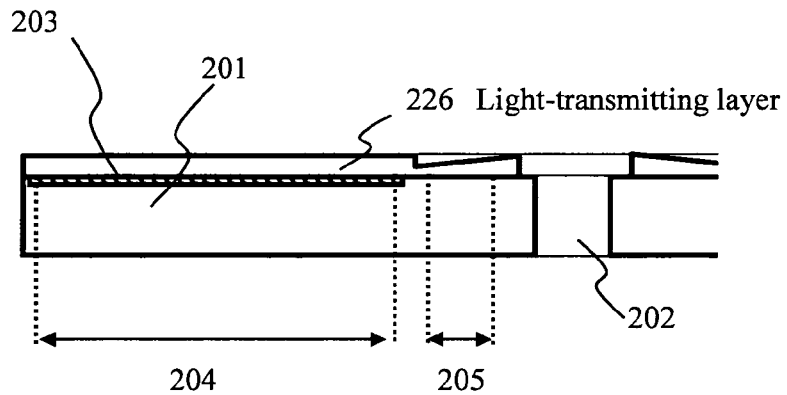
(c)
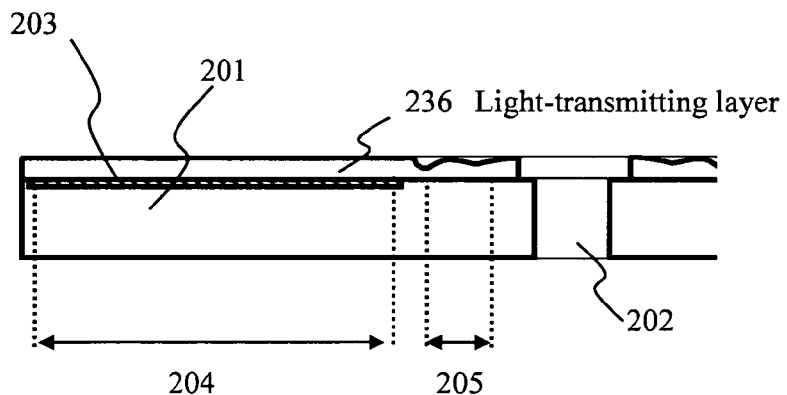

[Fig. 11]
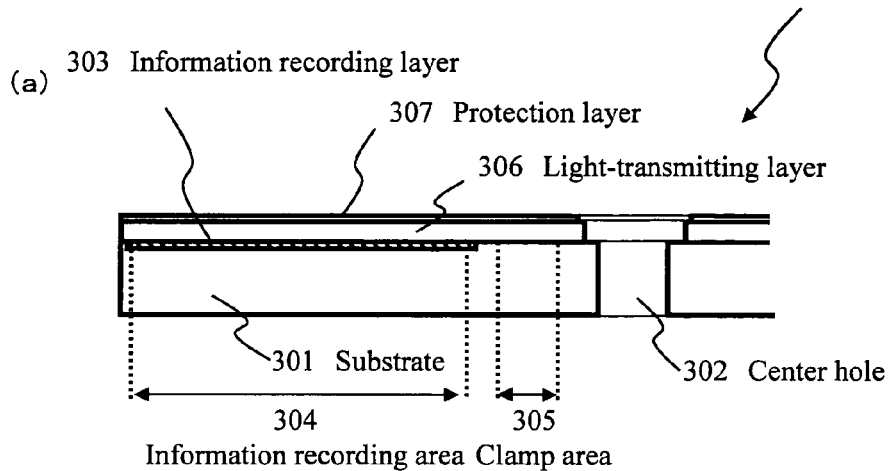
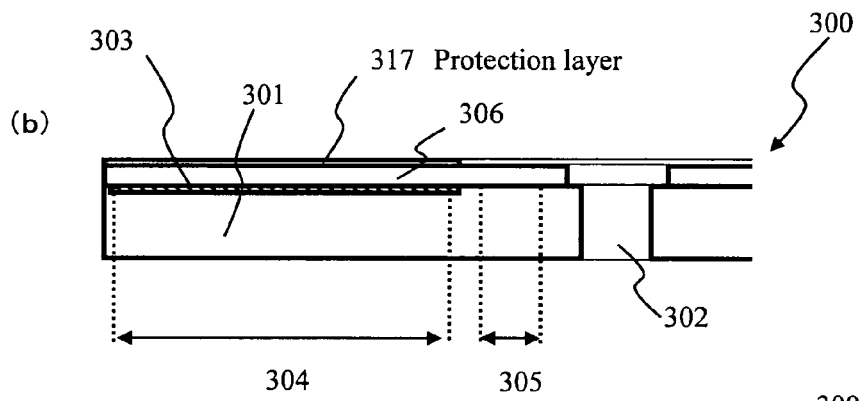
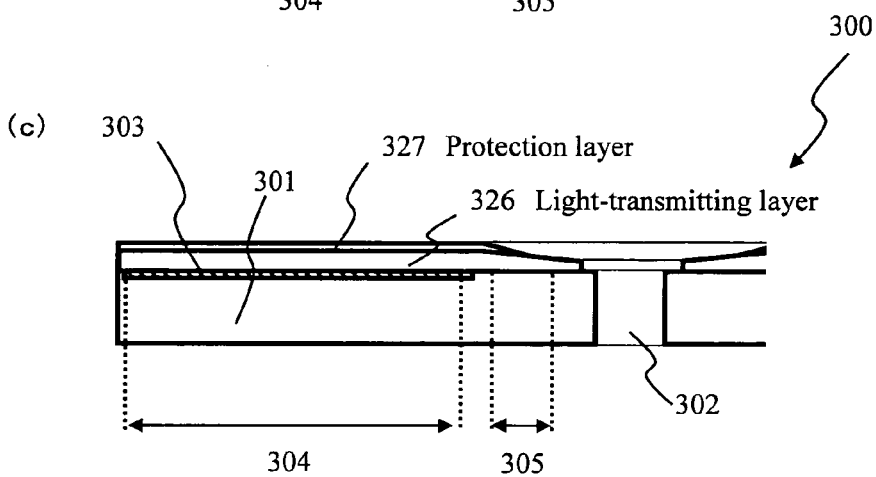

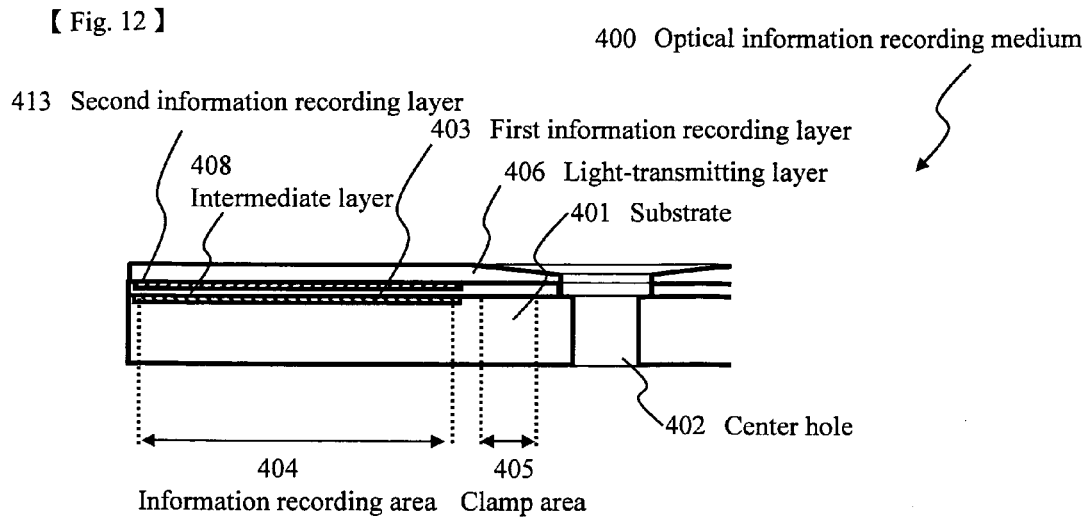
[Fig. 12]

OPTICAL INFORMATION RECORDING MEDIUM

BACKGROUND OF THE INVENTION

1. Field of the Invention

The present invention relates to an optical information recording medium, and more particularly relates to an optical information recording medium having at least one information recording layer and a light-transmitting layer on a main surface of a substrate.

2. Description of the Prior Art

Recently, research relating to various types of optical information recording has been studied in the optical information recording field. Optical information recording methods have been emerging which are applicable to a range of uses, because these methods can allow media to have higher density, can record/reproduce information by a non-contact method, and can also achieve these objectives at a low price. Currently, an optical disk has a structure produced, for example, by forming an information layer on a transparent resin layer with a thickness of 1.2 mm, and then covering and protecting the layer with an over coating, or by forming information layers on one or both sides of a transparent resin layer with an over coating, or by forming information layers on one or both sides of a transparent resin layer with a thickness of 0.6 mm, and then laminating two of the information layers.

Recently, as a way to increase the recording density of optical disks, methods have been studied such as increasing the numerical aperture (NA) of an objective lens, and shortening the wavelength of the laser. In these methods, if the thickness of a recording/reproducing carrier (which is a substrate of the side on which an optical laser is incident) is thin, the influence of an aberration of the laser spot decreases, and allowance for a gradient angle (tilt) of a disk increases. From this, an idea was proposed to set the thickness of the recording/reproducing carrier to be around 0.1 mm, NA to be around 0.85, and the wavelength of a laser to be around 400 nm (see Japanese unexamined patent publication H08-235638, for example). Here, considering effects on the focus of the recording/reproducing light and risk of spherical aberration, it is preferable that the thickness variation of the recording/reproducing carrier is reduced to be within 5%. Even in an optical disk having such reduced thickness variation, the recording/reproducing carrier of which has thickness is 0.1 mm, a thickness of the disk is preferably 1.2 mm like a conventional CD or DVD because the disk should have compatibility with existing hardware.

An optical disk having a recording/reproducing carrier with a thickness of 0.1 mm has an asymmetrical structure in the thickness direction because the thickness of the disk is 1.2 mm. Because of the asymmetrical structure, warping of the optical disk occurs due to variations in environmental conditions such as temperature or humidity. More specifically, when placing the optical disk, which is at room temperature, in a recording/reproducing machine which has been heated to 50 degrees C. by uninterrupted operations, drastic warping occurs in a short time.

SUMMARY OF THE INVENTION

The object of the present invention is to provide an optical information recording medium which has tolerance to warping.

The information described below was discovered in an investigation by the present inventors. That is, the warping of an optical information recording medium occurs because heat conduction from a clamp area occurs quickly. (The clamp area is a contact portion of the recording medium and a recording/reproducing machine).

Therefore, an optical information recording medium of the present invention comprises a substrate, at least one information recording layer formed on a main surface of the substrate and a light-transmitting layer which covers the information recording layer. The substrate comprises a clamp area and an information recording area corresponding to the information recording layer. An average thickness of the light-transmitting layer corresponding to the clamp area is thinner than an average thickness of the light-transmitting layer corresponding to the information recording area.

In the medium, even when the medium is placed in a drive which has been heated by repeated recording/reproducing, a stable recording/reproducing of the medium is possible without causing drastic warping.

In addition, in the medium of the present invention, a thickness of the substrate and the thickness of the light-transmitting layer are different.

The medium has an asymmetrical structure in a direction perpendicular to the film surface. Here, the warping caused by the asymmetrical structure can also be reduced.

The medium of the present invention has a total thickness in the range of approximately 1.14 to 1.50 mm.

In the medium of the present invention, the light-transmitting layer corresponding to the information recording area preferably has a thickness of approximately 100 μm, or approximately 75 μm.

In the medium, it is preferable that the average thickness of the light-transmitting layer corresponding to the clamp area is approximately 95% or less than the average thickness of the light-transmitting layer corresponding to the information recording area.

Thus, warping of the medium can be reduced.

In the medium, it is also preferable that the average thickness of the light-transmitting layer corresponding to the clamp area is approximately 70% or more than the average thickness of the light-transmitting layer corresponding to the information recording area.

Thus, a focusing position of an optical recording/reproducing beam is stably found when performing the recording/reproducing of the medium.

A light-transmitting layer is radiation setting resin.

In addition, the light-transmitting layer comprises a plurality of materials. At least one of the plurality of materials is preferably radiation setting resin.

Because of this, the medium can be made inexpensively, i.e., without using expensive materials.

At least one of the plurality of materials is preferably polycarbonate, and at least one of the plurality of materials is an adhesive material. The protection layer preferably has a pencil hardness of H or more.

In the optical information recording medium of the present invention, there is preferably a protection layer formed on a part of or on a whole area of a recording/reproducing side of the light-transmitting layer.

Thus, the light-transmitting layer is not easily scratched, and the quality of recorded/reproduced signals does not easily deteriorate.

In this situation, an average thickness of the protection layer corresponding to the clamp area is thinner than an average thickness of the protection layer corresponding to the information recording area.

In addition, the optical information recording medium of the present invention comprises a substrate, at least one information recording layer formed on a main surface of the substrate and a light-transmitting layer which covers the information recording layer. The substrate comprises a clamp area and an information recording area corresponding to the information recording layer. The average thickness of the light-transmitting layer corresponding to the clamp area is thinner than the average thickness of the light-transmitting layer corresponding to the information recording area. Alternatively, the protection layer may not be formed on the clamp area.

In the optical information recording medium of the present invention, even when the medium is placed in a drive which has been heated by repeated recording/reproducing, a stable recording/reproducing of the medium is possible without causing drastic warping.

In the medium, the thickness of the light-transmitting layer and the thickness of the substrate are different.

In the medium, a total thickness of the light-transmitting layer and the protection layer is preferably approximately 100 μm, or approximately 75 μm.

Here, the pencil hardness is determined by placing a sharpened pencil against the surface with a weight of 1 kg at an angle of 45 degrees, pulling the pencil under these conditions, and determining whether the surface is scratched or not. The pencil hardness is measured in accordance with JIS-K5400.

With an optical information recording medium of the present invention, even when the disk is placed in a drive which has been heated by repeated recording/reproducing, a stable recording/reproducing of the medium is possible without causing warping.

BRIEF DESCRIPTION OF THE DRAWINGS

FIG. 1 is a cross-sectional diagram showing an example of an optical information recording medium in Embodiment 1 of the present invention.

FIG. 2 a cross-sectional diagram showing an example of a conventional optical information recording medium.

FIG. 3 is a graph showing warp variation of a conventional optical information recording medium.

FIGS. 4 (a) and (b) are diagrams showing how warping of a conventional optical information recording medium is determined.

FIG. 5 is a cross-sectional diagram showing a conventional optical information recording medium which is clamped.

FIG. 6 (a) is a cross-sectional diagram showing an optical information recording medium of Example 1 of the present invention, and FIG. 6 (b) is a graph showing a relation between the thickness of a light-transmitting layer of a clamp area and a maximum amount of warp variation in the optical information recording medium of Example 1.

FIG. 7 is a cross-sectional diagram showing an example of a conventional optical information recording medium.

FIG. 8 is a graph showing a warp variation of a conventional optical information recording medium.

FIG. 9 (a) is a cross-sectional diagram showing an optical information recording medium of Example 2 of the present invention, and FIG. 9 (b) is a graph showing the relationship between the thickness of a light-transmitting layer in a clamp area and the maximum value of the amount of warp variation in the optical information recording medium of Example 2.

FIGS. 10 (a)-(c) are cross-sectional diagrams showing an example of deformation for an optical information recording medium of Embodiment 1 of the present invention.

FIGS. 11 (a)-(c) are cross-sectional diagrams showing an example of an optical information recording medium of Embodiment 2 of the present invention.

FIG. 12 is a cross-sectional diagram showing an example of the optical information recording medium of Embodiment 3 of the present invention.

DESCRIPTION OF THE PREFERRED EMBODIMENTS

Hereinafter, embodiments of the present invention will be explained by referring to the figures. These figures are shown by way of cross-section unless otherwise specified. If the figures are symmetric, then only a portion from the axis of symmetry is shown, and the rest of the figure is omitted.

Embodiment 1

FIG. 1 is an explanatory diagram showing an optical information recording medium 100 of the present invention. FIG. 1 shows a brief overview of the optical information recording medium 100 of the present invention. The medium 100 comprises an information recording layer 103 and a light-transmitting layer 106 on a main surface of a substrate 101 having a center hole 102. An information recording area 104 is an annular area on the substrate 101, where the information recording layer 103 is formed. In addition, an area formed at an inner area beyond an innermost circumference of the information recording area 104, where the medium 100 is clamped, is defined as a clamp area 105. The information recording area 104 and the clamp area 105 are neither overlapped nor contacted, and an annular area is formed between those areas. The light-transmitting layer 106 is formed to cover the information recording layer 103 at the information recording area 104 and also to cover the substrate 101 at the clamp area 105. More precisely, the light-transmitting layer 106 covers the information recording area 104 and the clamp area 105 of the substrate 101. In the light-transmitting layer 106, an area corresponding to the information recording area 104 is defined as a first area 106a, and an area corresponding to the clamp area 105 is defined as a second area 106b.

Here, in the light-transmitting layer 106 of the medium 100 of the present invention, an average thickness of the second area 106b is thinner than an average thickness of the first area 106a.

By employing the medium 100, even when the medium is placed in a drive which has been heated by repeated recording/reproducing, a stable recording/reproducing of the medium is possible without causing rapid, drastic warping.

Note that, in this Embodiment, the light-transmitting layer 106 can have both of the structures (1) comprising a sheet substrate and an adhesive material as shown in Example 1 described below; and (2) comprising a radiation-setting resin as shown in Example 2.

Example 1

Below, structures of an optical information recording medium based on a conventional technique and of the present invention are compared. Note that, FIG. 2 through FIG. 5 show the conventional technique, and FIGS. 6 (a) and (b) show the present invention.

As shown in FIG. 6(a), the optical information recording medium 110 comprises a substrate 111, an information recording layer 113 and a transmitting layer 116. The substrate 111 has a thickness of approximately 1.1 mm and a diameter of approximately 120 mm, and is made of polycarbonate applied by an injection molding method. The information recording layer 113 comprises a guide-groove with a depth of approximately 20 nm formed on the substrate 111 and a recording film which contains phase-changeable materials or dielectric materials formed on the guide-groove. The transmitting layer 116 is formed on the information recording layer 113 of the substrate 111 and comprises a sheet substrate 117 with a thickness of approximately 70 μm and an adhesive material 118 with a thickness of approximately 30 μm. The light-transmitting layer 116 has a thickness of approximately 100 μm and an inside diameter of approximately 22 mm. The layer 116 comprises the adhesive material 118 and the sheet substrate 117 that are fixed together as an integrated unit. The layer 116 can be made by applying the integrated unit onto the substrate 111 with a roller. The layer 116 may also be formed by the method of superimposing both items in a vacuum. The sheet substrate 117 is made of polycarbonate applied by a casting method and the adhesive material 118 is made of a resin material including acrylate as a main component.

The recording/reproducing was performed on the optical information recording medium 110 by using a laser with a wavelength of 405 nm and an objective lens with a numerical aperture of 0.85. By making the thickness of the light-transmitting layer 116 to be approximately 100 μm, the medium 110 could achieve warp tolerance equivalent to that of a conventional DVD.

In the light-transmitting layer 116 of the optical information recording medium 110, an average thickness of an area corresponding to a clamp area 115 is thinner than an average thickness of an area corresponding to an information recording area 114. Here, a thickness of the adhesive material 118 is constant at 30 μm, and the thickness of the sheet substrate 117 is different in an area 117a corresponding to the information recording area and an area 117b corresponding to the clamp area.

Note that, in the structure of the conventional device shown in FIG. 2, the thickness of the sheet substrate 117 is uniform, thus the average thickness of the light-transmitting layer 116 is uniform over the whole area.

Soon after placing the conventional optical information recording medium 110 shown in FIG. 2 in a drive which was heated to approximately 50 degrees C. by repeated recording/reproducing, drastic warping occurred in a short time on the medium 110, as shown in FIG. 3. FIG. 3 shows the amount of warp variation at a radial position of 58 mm of the medium 110 and the time when the medium is placed in the drive is defined as 0 seconds. Here, the amount of warp is identified as an angle 131 which is defined by a laser beam reflected on the information recording layer 113 and a laser beam entering from vertically below, which is the side of recording/reproducing data on the medium 110. The direction of warp shown in FIG. 4 (a) is defined as plus and that shown in FIG. 4 (b) is defined as minus.

As a reason for the occurrence of such drastic warping, it was assumed that the light-transmitting layer 116 had thermally expanded due to heat conduction from the clamp area 115. FIG. 5 shows the optical information recording medium 110 being clamped. A rotation center of the medium 110 is determined by a center cone 120, and the medium 110 is clamped at the clamp area 115 by a damper 121 and a turntable 119. The temperature of the whole drive became approximately 50 degrees C., however, the heat conducted faster from the clamper 121 and the turn table 119 (both of which directly contacted with the clamp area 115) toward the medium 110, than from the air. This greatly affected the occurrence of the warping.

As a way to reduce such warping of the optical information recording medium 110, a coefficient of thermal expansion or modulus of rigidity (Young's modulus) should have a small value. However, in order to achieve a small coefficient of thermal expansion, materials for use for the light-transmitting layer 116 are considerably restricted, and the medium 110 itself is possibly expensive.

Next, in the structure of the present invention shown in FIG. 6(a), by changing the thickness of the light-transmitting layer 116 formed on the clamp area 115, the amount of warp of the medium 110 was measured.

As shown in FIG. 6 (b), the thickness of the light-transmitting layer 116 corresponding to the clamp area 115 was changed relative to the thickness of the light-transmitting layer 116 corresponding to the information recording area 114. Here, on the layer 116 comprising the sheet substrate 117 and the adhesive material 118, the thickness of the adhesive material 118 was 30 μm, and only the thickness of the region 117b of the sheet substrate 117 corresponding to the clamp area was changed.

As shown in FIG. 6 (b), the warping decreased by reducing the thickness of the light-transmitting layer 116 corresponding to the clamp area 115. This was considered to be because the thickness of the light-transmitting layer 116 corresponding to the clamp area 115 was reduced, and so the modulus of rigidity became small and the force which warped the substrate 111 also weakened. From these findings, reducing the thickness of the layer 116 corresponding to the clamp area 115 up to approximately 60 μm is extremely effective; however, it is not very effective over 60 μm. It is preferable that the amount of warp of the optical information recording medium is as small as possible. By reducing the amount of warp by approximately 80%, the recording/reproducing properties can greatly improve. In other words, the thickness of the light-transmitting layer 116 corresponding to the clamp area 115 is preferably 95 μm or less, and is preferably 95% or less than the thickness of the light-transmitting layer 116 corresponding to the information recording area 114.

Here, when reducing the layer 116 corresponding to the clamp area 115, the thicknesses of the layer 116 corresponding to the clamp area 115 and the layer 116 corresponding to the information recording area 114 are different, so the surface of the medium is uneven. This may cause the problem that the focusing position of the laser when recording/reproducing may easily become unstable. Therefore, if the thickness of the clamp area 115 is different in each disk, the range of motion for a drive system which changes the focusing position of the recording/reproducing laser needs to be wide. Thus, the thickness of the light-transmitting layer 116 corresponding to the clamp area 115 is preferably close to the thickness of the layer 116 corresponding to the information recording area 114. Namely, the thickness of the light-transmitting layer 116 corresponding to the clamp area 115 is preferably 70 μm or more, and is preferably 70% or more of the thickness of the layer 116 corresponding to the information recording area 114.

Also, a light-transmitting layer formed of a sheet substrate and radiation-setting resin (UV radiation-setting resin, for example) had almost the same results in comparison to the light-transmitting layer 116 formed of the sheet substrate 117 and the adhesive material 118 as described in the present embodiment. In addition, when the proportion of the thickness of the adhesive material or the radiation-setting resin was changed in a range between 5% and 50% of the light-transmitting layer, almost the same effect was obtained.

Note that, "radiation" here includes all electromagnetic waves which can harden radiation-setting resin, for example, infrared rays, visible rays, ultraviolet rays, X rays and the like.

In this embodiment, an example of a rewriteable optical disk was described. In addition, the present invention can be applied to a write-once type disk which can record only once and a read-only type optical disk having Al or Ag as main components in the reflective layer. Furthermore, the present invention can be applied not only in situations in which only one layer is formed on the information recording layer 113 as shown in this embodiment, but also in situations in which a plurality of layers are formed on the information recording layer 113, or a multi-layered optical disk which includes two or more information recording layers 113.

Hereinabove, the embodiment of the present invention has been explained by using examples. Note that the invention is not limited to the above-mentioned embodiment, and it is also possible to apply the present invention to other embodiments based on the technical idea of the present invention. In addition, the optical information recording medium 100 of the present invention can be available for a Blu-ray disc, DVD, CD, MD, MO and the like, for example.

Example 2

Below, structures of an optical information recording medium based on a conventional technique and of the present invention are compared. For descriptions which correspond to Example 1, overlapping explanations may be omitted. Note that, FIG. 7 and FIG. 8 show the conventional technique, and FIGS. 9(a) and (b) show an embodiment of the present invention.

In FIG. 9 (a), an optical information recording medium 200 of the present invention is shown. In the medium 200 in FIG. 9, a substrate 201 was employed, which was the same as the substrate of Example 1, and a light-transmitting layer 206 was formed only of radiation-setting resin.

Here, in the light-transmitting layer 206 of the medium 200 of the present invention, the average thickness of a second region 206b corresponding to the clamp area is thinner than an average thickness of a first region 206a corresponding to the information recording area.

Note that, in the structure of the conventional technique shown in FIG. 7, the average thickness of the light-transmitting layer 206 is uniform over the whole area.

The warping of the conventional medium 200 shown in FIG. 7 was measured when placing it in a drive which was heated to approximately 50 degrees C., the same as in Example 1. The results of the measurement are shown in FIG. 8. The denotations of the graph are the same as FIG. 3 (the example of the conventional technique) in Embodiment 1. Compared to the light-transmitting layer 116 of Embodiment 1 (see FIG. 3) formed by the sheet substrate 117 and the adhesive material 118, the amount of warp became large in the present example in which only the radiation-setting resin is used. The radiation-setting resin here including acrylate as a main component has an enormously large coefficient of thermal expansion compared to that of polycarbonate used in a general substrate. Therefore, the amount of warp becomes extremely large.

Here, in the structure of the present invention shown in FIG. 9 (a), the amount of warp was measured while changing the thickness of the second area 206b of the light-transmitting layer 206 corresponding to the clamp area. The thickness of the second area 206b was reduced by polishing. The amount of warp while changing the thickness is shown in FIG. 9 (b). Because the maximum amount of warp variation was as large as 0.5 degrees when the thickness was 100 μm, reducing the thickness of the second region corresponding to the clamp area 206b was found to be very effective. The maximum amount of warp variation is preferably around 0.3 degrees. Like Example 1, in order to reduce the amount of warp by 80% or more, the thickness of the second area 206b is preferably 95 μm or less, and is preferably 95% or less than the thickness the first region corresponding to the information recording area 206a.

In addition, as described in Example 1, if the second region 206b of the light-transmitting layer 206 corresponding to the clamp area is too thin, then the focusing position of the recording/reproducing laser becomes unstable. More specifically, the thickness of the second region 206b is preferably 70 μm or more, and is preferably 70% or more than the first region 206a corresponding to the information recording area.

Modification Example of the Embodiment 1

When forming the light-transmitting layer 206 using radiation-setting resin, the shape of the layer 206 easily changes because the resin is liquid before curing. Therefore the shape of the region of the light-transmitting layer corresponding to the clamp area can have not only the shape shown in FIG. 9(a) but can also easily have: the shape of the second region 216b corresponding to the clamp area shown in FIG. 10 (a) which gradually becomes thicker toward the outer circumference; the shape of the second region 226b corresponding to the clamp area shown in FIG. 10 (b) which gradually becomes thinner toward the outer circumference; or the shape of the second region 236b corresponding to the clamp area shown in FIG. 10 (c) which has a wavy shaped cross-section. Even with these shapes, the effect was almost the same as that described in Embodiment 1, and the amount of warp of the medium was found to depend on the average thickness of the second region of the light-transmitting layer corresponding to the clamp area.

However, in the shapes of the second region corresponding to the clamp area as shown in FIG. 10 (a) to FIG. 10 (c), clamping the optical information recording medium becomes difficult and it may affect the recording/reproducing. Thus, the shape should be chosen not to affect the recording/reproducing.

Here, although only the example of the light-transmitting layer is described, which is made of one type of radiation-setting resin, the layer may have a structure in which a plurality of types of radiation-setting resin are stacked. Thus, in the light-transmitting layer comprising a plurality of layers, a similar effect can also be obtained.

In this embodiment, an example of a rewriteable optical disk is described. In addition, the present invention can be applied to a write-once type disk which can record only once and a read-only type optical disk having Al or Ag as main components in the reflective layer. Furthermore, the present invention can be applied not only in situations in which only one layer is formed on the information recording layer, but also situations in which multiple layers are formed on the information recording layer, or a multi-layered optical disk that includes two or more information recording layers.

Hereinabove, the embodiment of the present invention is explained by examples. Note that, the invention is not limited to the above-mentioned embodiment, and it is also possible to apply the present invention to other embodiments based on the technical idea of the present invention.

Embodiment 2

An example of an optical information recording medium according to the present invention will be explained using FIGS. 11(a)-(c). Note that, for descriptions that correspond to embodiment 1, overlapping explanations may be omitted. Note that, FIGS. 11 (b) and (c) show the structure of the present invention, and FIG. 11 (a) shows the structure of the conventional technique.

In a disk with high-density of which the thickness of the light-transmitting layer (as described in Embodiment 1) is approximately 100 µm, and recording/reproducing is performed under the conditions that NA is approximately 0.85 and the wavelength of the laser is approximately 400 nm, the signal quality easily deteriorates compared to conventional CDs and DVDs because of flaws or dust on the surface of the light-transmitting layer. Thus, it is necessary to form the protection layer on the surface of the light-transmitting layer of the optical information recording medium 300.

The protection layer needs to have high scratch tolerance, and its pencil hardness is preferably H or more. To form the protection layer, UV setting resin is generally used. By mixing inorganic oxide particles into the resin, the hardness can further increase. When forming the protection layer using such UV setting resin, the layer usually has a large coefficient of thermal expansion and modulus of rigidity because it has a high degree of hardness after hardening.

When the protection layer has a larger coefficient of thermal expansion and a higher modulus of rigidity than those of the material for the substrate, even if the layer is made to be thin, such as with a thickness of approximately 1-5 µm, the layer expands by the heat conducted from the damper 121 or the turntable 119 as described in FIG. 5 (the conventional example) of Embodiment 1, and more drastic warping will occur as described in the conventional example of Embodiment 1.

In the conventional optical information recording medium shown in FIG. 11 (a), the protection layer 307 is formed on the whole recording/reproducing side of the transmitting layer 306. The average thickness of the protection layer 307 formed on the clamp area 305 is equal to the average thickness of the protection layer 307 formed on the information recording area 304.

On the contrary, in the optical information recording medium 300 of the present invention shown in FIG. 11 (b), the average thickness of the second region 317b of the protection layer 317 corresponding to the clamp area is thinner than the average thickness of the first region 317a corresponding to the information recording area. Note that, the protection layer is generally thin so that the disk can be stably clamped in most situations. It is also possible not to form a protection layer on the clamp area of an optical information recording medium.

In addition, as shown in FIG. 11 (c), it is also possible that both the thickness of a light-transmitting layer 326 and a protection layer 327 of the medium 300 in the clamp area 305 is thinner than those in the information recording area 304, respectively. More precisely, in the light-transmitting layer 326, an average thickness of a second region 326b corresponding to the clamp area is thinner than an average thickness of the first region 326a corresponding to the information recording area. Furthermore, in a protection layer 327, an average thickness of the second region 327b is thinner than an average thickness of the first region 327a corresponding to the information recording area. In FIG. 11 (c), an example is shown in which the light-transmitting layer 326 is formed in a tapered shape in the clamp area 305; however, the layer 326 may have a shape like the light-transmitting layer 106 shown in FIG. 1.

Hereinabove, the embodiment of the present invention is explained by examples. Note that, the invention is not limited to the above-mentioned embodiment, and it is also possible to apply the present invention to other embodiments based on the technical idea of the present invention.

Embodiment 3

Here, an example of an optical information recording medium according to the present invention is explained. Note that, for descriptions which correspond to Embodiments 1 or 2, overlapping explanations may be omitted.

In the above-mentioned embodiments, although a medium having only one information recording layer has been explained, the present invention is also effective for a medium having two or more information recording layers, which is called a multiple-layer disk.

For example, in an optical information recording medium 400 shown in FIG. 12 having two information recording layers, which is called a double-layer disk, an intermediate layer 408 having a range of thickness between approximately 20 µm and approximately 30 µm is formed between a first information recording layer 403 and a second information recording layer 413, and a light-transmitting layer 406 is formed in a range of thickness between approximately 70 µm to approximately 80 µM. Here, in the light-transmitting layer 406, the effect of decreasing the warp as described in Embodiment 1 or 2 was also obtained by reducing the average thickness of the second region 406b corresponding to the clamp area compared to that of the first region 406a corresponding to the information recording area. Particularly, when the average thickness of the second region 406b was reduced by 95% or less, a better effect was obtained.

The reason for choosing the range of thickness between 20 and 30 µm for the intermediate layers is to decrease the effect of the reflected light from the other layers when recording/reproducing each layer, and to make the recording/reproducing light capable of distinguishing the difference of the depth from the surface of the light-transmitting layer of the first information recording layer 403 and the second information recording layer 413. By setting the depth from the surface of the light-transmitting layer of the first information recording layer 403 at approximately 100 µm, the medium can achieve warp tolerance equivalent to that of a conventional DVD as described in Embodiment 1.

It is possible to achieve the same effect by reducing the intermediate layer 408 corresponding to the clamp area 405 or both the light-transmitting layer 406 and the intermediate layer 408 corresponding to the clamp area 405, rather than by reducing the second region 406b of the light-transmitting layer 406 corresponding to the clamp area. Also in these situations, the total thickness of the light-transmitting layer 406 and the intermediate layer 408 corresponding to the clamp area 405 is preferably 95% or less than the total thickness of the light-transmitting layer 406 and the intermediate layer 408 corresponding to the information recording area 404. In addition, as described in Embodiment 1, in order to avoid a wide range of motion for the drive system which changes the focusing position of the recording/reproducing laser, the total thickness of the light-transmitting layer 406 and the intermediate layer 408 corresponding to the clamp area 405 is preferably 70 µm or more, and is preferably 70% or more than the total thickness of the light-transmitting layer 406 and the intermediate layer 408 corresponding to the information recording area 404.

Even in such multiple-layer disk, having a protection layer as described in Embodiment 2 is preferable. Therein, reducing warping of the optical information recording medium is preferably by such method of reducing the thickness of the protection layer corresponding to the clamp area as described in Embodiment 2 or the like.

Hereinabove, the embodiment of the present invention is explained by examples. Note that, the invention is not limited to the above-mentioned embodiment, and it is also possible to apply the present invention to other embodiments based on the technical idea of the present invention.

An optical information recording medium of the present invention has an advantage of having tolerance to warping, and the medium will be useful for a recording medium such as Blu-ray disc.

What is claimed is:

1. An optical information recording medium comprising:
   a substrate including a clamp area and an information recording area;
   at least one information recording layer formed on the information recording area of said substrate; and
   a light-transmitting layer formed on said substrate and covering said information recording layer and the clamp area, wherein
   the clamp area is located inward of the information recording area of said substrate,
   an average thickness of said light-transmitting layer adjacent to the clamp area is thinner than an average thickness of said light-transmitting layer adjacent to the information recording area,
   said substrate has a surface that is free of an information recording layer, and
   said light-transmitting layer is a monolayer of radiation setting resin.

2. The optical information recording medium of claim 1, wherein a thickness of said substrate and a thickness of said light-transmitting layer are different.

3. The optical information recording medium of claim 1, wherein the optical information recording medium has a total thickness in a range of approximately 1.14 to 1.50 mm.

4. The optical information recording medium of claim 1, wherein said light-transmitting layer adjacent to the information recording area has a thickness of approximately 100 µm.

5. The optical information recording medium of claim 1, wherein said light-transmitting layer adjacent to the information recording area has a thickness of approximately 75 µm.

6. The optical information recording medium of claim 1, wherein the average thickness of said light-transmitting layer adjacent to the clamp area is approximately 95% or less than the average thickness of said light-transmitting layer adjacent to the information recording area.

7. The optical information recording medium of claim 1, further comprising a protection layer formed on at least a part of a recording/reproducing side of said light-transmitting layer.

8. The optical information recording medium of claim 7, wherein said protection layer has a pencil hardness of H or more.

9. The optical information recording medium of claim 7, wherein an average thickness of said protection layer adjacent to the clamp area is thinner than an average thickness of said protection layer adjacent to the information recording area.

10. The optical information recording medium of claim 1, wherein a surface of said light transmitting layer adjacent to the clamp area and facing away from the clamp area is recessed with respect to a surface of said light transmitting layer adjacent to the information recording area and facing away from the information recording area.

11. An optical information recording medium comprising:
    a substrate including a clamp area and an information recording area;
    at least one information recording layer formed on the information recording area of said substrate; and
    a light-transmitting layer formed on said substrate and covering said information recording layer and the clamp area, wherein
    the clamp area is located inward of the information recording area of said substrate,
    an average thickness of said light-transmitting layer adjacent to the clamp area is thinner than an average thickness of said light-transmitting layer adjacent to the information recording area,
    said substrate has a surface that is free of an information recording layer,
    said light-transmitting layer is radiation setting resin, and
    the average thickness of said light-transmitting layer adjacent to the clamp area is approximately 70% to 95% of the average thickness of said light-transmitting layer adjacent to the information recording area.

12. The optical information recording medium of claim 11, wherein a thickness of said substrate and a thickness of said light-transmitting layer are different.

13. The optical information recording medium of claim 11, wherein the optical information recording medium has a total thickness in a range of approximately 1.14 to 1.50 mm.

14. The optical information recording medium of claim 11, wherein said light-transmitting layer adjacent to the information recording area has a thickness of approximately 100 µm.

15. The optical information recording medium of claim 11, wherein said light-transmitting layer adjacent to the information recording area has a thickness of approximately 75 µm.

16. The optical information recording medium of claim 11, wherein the average thickness of said light-transmitting layer adjacent to the clamp area is approximately 95% or less than the average thickness of said light-transmitting layer adjacent to the information recording area.

17. The optical information recording medium of claim 11, further comprising a protection layer formed on at least a part of a recording/reproducing side of said light-transmitting layer.

18. The optical information recording medium of claim 17, wherein said protection layer has a pencil hardness of H or more.

19. The optical information recording medium of claim 17, wherein an average thickness of said protection layer adjacent to the clamp area is thinner than an average thickness of said protection layer adjacent to the information recording area.

20. An optical information recording medium comprising:
a substrate including a clamp area and an information recording area;
at least one information recording layer formed on the information recording area of said substrate;
a light-transmitting layer formed on said substrate and covering said information recording layer and the clamp area; and
a protection layer formed on at least a part of a recording/reproducing side of said light-transmitting layer, wherein
the clamp area is located inward of the information recording area of said substrate,
an average thickness of said protection layer adjacent to the clamp area is thinner than an average thickness of said protection layer adjacent to the information recording area,
said substrate has a surface that is free of an information recording layer, and
said light-transmitting layer is a monolayer of radiation setting resin.

21. The optical information recording medium of claim 20, wherein said protection layer has a pencil hardness of H or more.

22. The optical information recording medium of claim 20, wherein a thickness of said light-transmitting layer and a thickness of said substrate are different.

23. The optical information recording medium of claim 20, wherein a total thickness of said light-transmitting layer and said protection layer is approximately 100 μm.

24. The optical information recording medium of claim 20, wherein a total thickness of said light-transmitting layer and said protection layer is approximately 75 μm.

25. An optical information recording medium comprising:
a substrate including a clamp area and an information recording area;
at least one information recording layer formed on the information recording area of said substrate; and
a light-transmitting layer formed on said substrate and covering said information recording layer and the clamp area, wherein
the clamp area is located inward of the information recording area of said substrate,
an average thickness of said light transmitting layer adjacent to the clamp area is thinner than an average thickness of said light transmitting layer adjacent to the information recording area,
the average thickness of said light transmitting layer adjacent to the clamp area is greater than one half of the average thickness of said light transmitting layer adjacent to the information recording area, and
said light-transmitting layer is a monolayer of radiation setting resin.

26. The optical information recording medium of claim 25, wherein said substrate has a surface that is free of an information recording layer.

27. The optical information recording medium of claim 25, wherein a surface of said light transmitting layer adjacent to the clamp area and facing away from the clamp area is recessed with respect to a surface of said light transmitting layer adjacent to the information recording area and facing away from the information recording area.

* * * * *